G. H. WHEARY.

WARDROBE TRUNK.

APPLICATION FILED SEPT. 14, 1911.

Reissued Apr. 9, 1912.

13,404.

3 SHEETS—SHEET 1.

WITNESSES.

L. G. Thomer

Katherine Holt

INVENTOR.

George H. Wheary.

By Moore & Baldwin.

ATTORNEYS.

G. H. WHEARY.

WARDROBE TRUNK.

APPLICATION FILED SEPT. 14, 1911.

Reissued Apr. 9, 1912.

13,404.

3 SHEETS—SHEET 2.

WITNESSES.

L. G. Thurer

Katherine Holt

INVENTOR.

George H. Wheary.

By Morrell Caldwell.

ATTORNEYS.

G. H. WHEARY.

WARDROBE TRUNK.

APPLICATION FILED SEPT. 14, 1911.

Reissued Apr. 9, 1912.

13,404.

3 SHEETS—SHEET 3.

WITNESSES

L. J. Thurner

Katherine Holt

INVENTOR.

George H. Wheary.

By Morrell & Caldwell.

ATTORNEYS.

UNITED STATES PATENT OFFICE.

GEORGE H. WHEARY, OF RACINE, WISCONSIN, ASSIGNOR TO THE HARTMAN TRUNK COMPANY, OF RACINE, WISCONSIN.

WARDROBE-TRUNK.

13,404. Specification of Reissued Letters Patent. Reissued Apr. 9, 1912.

Original No. 939,575, dated November 9, 1909, Serial No. 484,710. Application for reissue filed September 14, 1911. Serial No. 649,396.

*To all whom it may concern:*

Be it known that I, GEORGE H. WHEARY, a citizen of the United States, residing at Racine, in the county of Racine and State of Wisconsin, have invented a new and useful Wardrobe-Trunk, of which the following is a specification.

This invention relates to wardrobe trunks and one of its objects is to provide a trunk body having a wardrobe section mounted to swing into an upright position but which, when in such position, is disposed entirely outside the trunk casing, so as to in no wise interfere with the removal of any portion of the contents of the trunk or occupy any space within the trunk casing which might otherwise be used for packing purposes.

A further object is to provide a trunk of this type which is of very compact structure, simple and durable, and which permits the simultaneous use of the trunk both as a packing case and a wardrobe.

With these and other objects in view the invention consists in certain novel details of construction and combinations of parts hereinafter more fully described and pointed out in the claims.

In the accompanying drawings the preferred forms of the invention have been shown.

Figure 1:
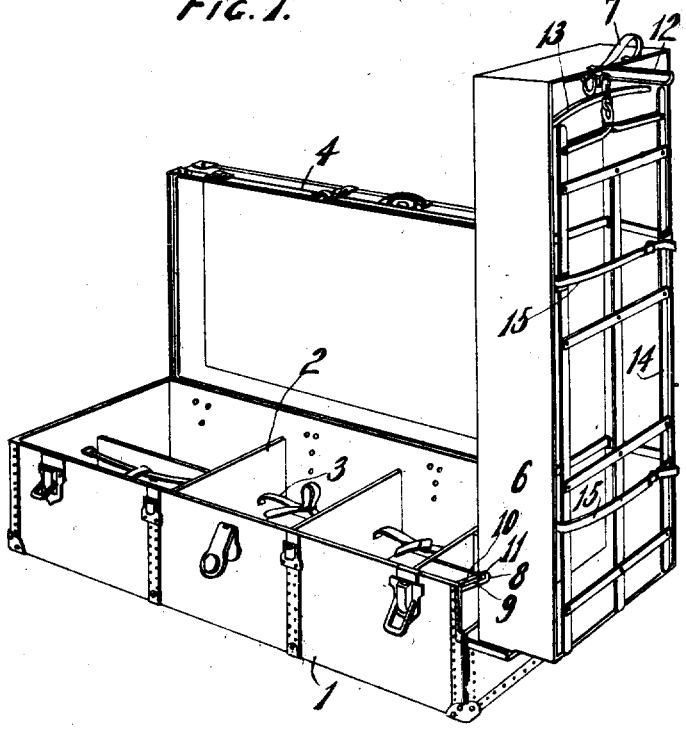
Figure 2:
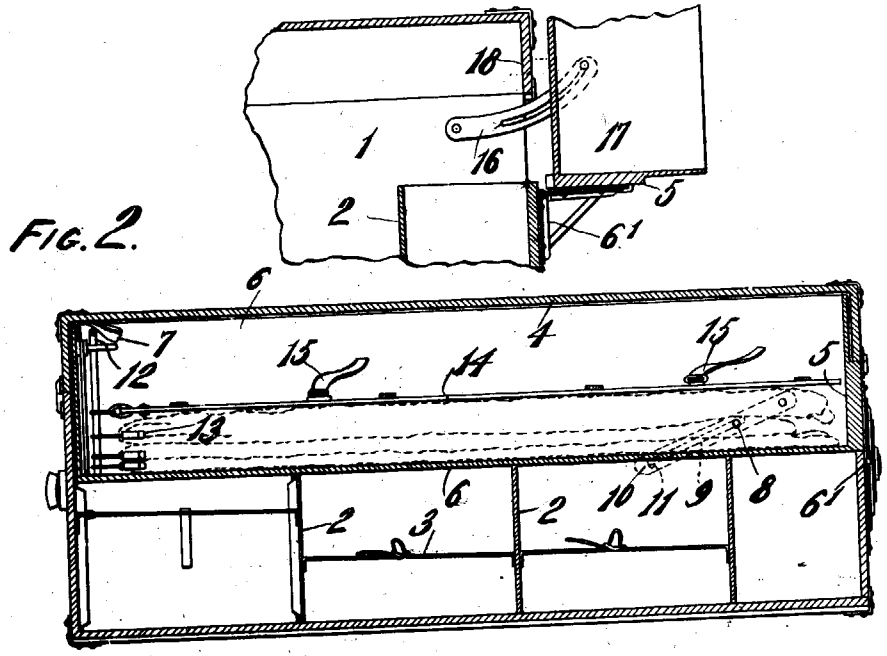
Figure 3:
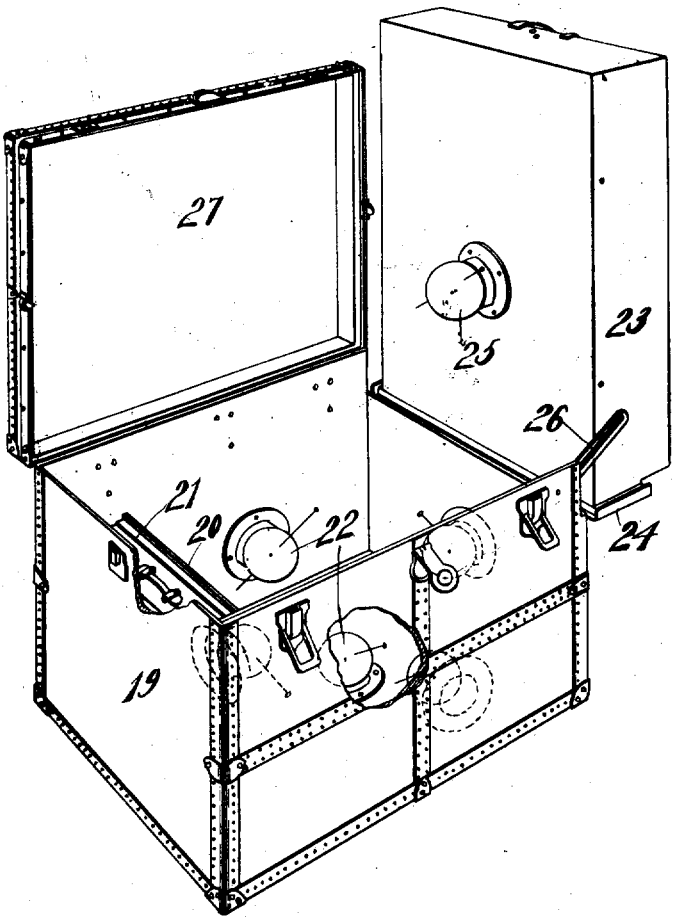

In said drawings:—Figure 1 is a perspective view of a wardrobe trunk constructed in accordance with the present invention, the trunk casing being open and the wardrobe section elevated. Fig. 2 is a central vertical longitudinal section through the trunk, the same being closed. Fig. 3 is a perspective view of a modified form of trunk, the same being shown with its wardrobe section elevated. Fig. 4 is a section through one end of a modified form of trunk, the cover of said trunk being closed and the wardrobe section elevated.

Referring to the figures by characters of reference 1 designates a casing constituting the body of a trunk, the same being preferably of the "steamer" type, and having its bottom portion subdivided into compartments by means of partitions 2, means, such as straps 3, being provided for the purpose of holding articles within the various compartments. The casing is provided with a hinged cover 4 of the usual or any preferred form.

One of the end walls of the casing does not extend to the upper edge of the casing, but is instead provided with a panel 5 which is hingedly connected to it as indicated at 6′. The wardrobe section 6 is secured at one end to this panel, and when it is in its normal position upon the partitions 2 the said section projects above the wall of the casing 1 and also above the upper edge of the panel 5 in the same manner as does a tray such as ordinarily used in connection with trunks. Said section however does not extend such a distance as to prevent the closing of the cover 4. A strap 7 is secured to that end of the section 6 farthest removed from the panel 5, and extending laterally from said section are one or more studs 8 each of which is movably mounted within a slot 9 formed longitudinally within a link 10. The link is pivotally connected to the inner face of either the front or the rear wall of casing 1, and a notch 11 is formed in the upper end of the upper wall of the slot 9, so as to receive the studs 8 when the section 6 is swung into an upright position as indicated in the Fig. 1. As heretofore stated one of these links 10 may be located at each side of the section 6, one of the links being shown in full lines in Fig. 1 and the other link being indicated by dotted lines in Fig. 2. The wardrobe section 6 is provided in that end thereof from which the strap 7 extends, with a supporting frame 12, designed to swing into or out of the section 6 and constituting a support for a series of clothes-hangers 13 and for a frame 14. This frame is designed to press against the garments suspended within the section 6 so as to hold them against displacement while the section is being raised or lowered, straps 15 being utilized for the purpose of binding the frame 14 against the clothing.

As heretofore pointed out when the section 6 is in its normal position it rests within the casing 1 and upon the partitions 2, the upper portion of the section projecting above the upper edges of the walls of the casing and into the closed cover 4. The panel 5 of course closes the end of the casing, it being thus held by the section 6.

When it is desired to use the trunk it is not necessary to stand it on end, as in most devices of this character, but, instead, the cover 4 is raised as ordinarily, and the section 6 is then pulled into an upright position by means of the straps 7. Thus during this movement the studs 8 travel within the slots 9 until they assume positions beneath the notches 11, whereupon the links 10 drop into engagement with the studs and thus lock the section 6 into an upright position. When said section is thus located it is disposed entirely outside of the casing 1 and all parts of the interior of the casing are thus readily accessible and can be used for packing purposes.

If preferred, and as shown in Fig. 4, the links can be so arranged as to permit the cover 4 to be closed while the wardrobe section 6 is elevated. By referring to this figure it will be noticed that the links 16 are curved and their pivots so located that when the wardrobe section 17 is in raised position the links will not interfere with the closing of the cover 18. In other respects this form of trunk is similar to that heretofore described.

In Fig. 3 of the drawings the present improvements have been shown applied to a hat trunk. In this figure the trunk casing is indicated at 19, said casing being subdivided by means of partitions 20 into a compartment for the reception of a box 21 and another compartment in which are arranged hat holders 22. The box 21 is designed to hold shoes, slippers, etc., and the holders 22 are so shaped as to fit into the crowns of hats, the end portions of the holders being in the form of pads into which hat-pins can be inserted for the purpose of securing hats thereto. The wardrobe section 23 of the trunk is mounted upon an end panel 24 which is similar to the panel 5 heretofore referred to, and the bottom of the wardrobe section may be provided with a hat holder 25 similar to the holders heretofore referred to. The wardrobe section is designed to be held in raised position by means of one or more links 26 similar to the links 10, and when the section is not in use the same can be swung downwardly on to the partition 20, so as to bring the panel 24 into closed position and permit the cover 27 to be lowered.

Particular attention is called to the fact that the wardrobe section is in the form of a tray when within the trunk and is provided with a bottom portion having side and end portions rigidly connected thereto and movable therewith. The lower end portion of the section, when the section is in upright position, serving as a shelf to hold articles of apparel, etc. This shelf portion also serves to protect and hold in place the apparel placed within the section.

It is of course to be understood that various changes may be made in the construction and arrangement of the parts without departing from the spirit or sacrificing the advantages of the invention.

What is claimed is:—

1. A trunk comprising a casing, a closure for the top thereof, a hinged panel normally flush with and constituting a portion of one wall of the casing, means movably engaging the casing and panel to hold said panel at right angles to the end wall of the casing, and a wardrobe section mounted upon said panel, the panel constituting the bottom of the section when said section extends upwardly from the outwardly extending panel and with its outer face open, said outer face constituting the top of the section when the panel is in alinement with the end wall, said section being shiftable into the casing to constitute a tray.

2. A trunk comprising a casing, a closure for the top thereof, a panel hingedly connected to one end wall of the casing and normally flush therewith, means movably connecting the casing and panel for supporting said panel at right angles to the end wall of the casing, a wardrobe section mounted upon the panel, said panel constituting the bottom thereof, said section being shiftable into the upper portion of the casing to constitute a tray and into an upright position outside of the casing to constitute a wardrobe, the said section having an open face constituting the top thereof when the section is within the casing and the outer portion thereof when the section is in upright position outside of the casing, the closure being movable to shut position while the wardrobe section is outside of the casing.

3. A trunk, comprising a casing having an open top, a wardrobe section hinged to one end portion of the casing and movable to a position within the casing and through the open top to a vertical position outside of the casing, said wardrobe section being in the form of a tray when within the casing and having a bottom portion with side and end portions connected thereto and movable therewith and an open top, said open top facing outwardly from the casing when in vertical position and said tray bottom serving to support wearing apparel suspended within the section when said section is in a closed position, and a cover hinged to the side of the casing and adapted to cover the open top of the casing and the tray.

4. A trunk, comprising a casing having an open top, a cover for said casing, and a wardrobe section hinged to one end portion of the casing and movable to a position within the casing and through the open top to a vertical position outside of the casing, said wardrobe section being in the form of a tray when within the trunk and having a bottom portion with side and end portions connected thereto and movable therewith and an open top, said open top facing outwardly from the casing when in vertical position and said tray bottom serving to support wearing apparel suspended within the section when said section is in a closed position, said section when in a vertical position being out of the path of movement of the casing cover.

5. A wardrobe trunk, comprising a casing having an open top, a cover therefor, and a wardrobe section having the lower portion of one of its ends hinged to the upper portion of one of the ends of the casing, said wardrobe section being in the form of a tray when within the casing and having a bottom portion with side and end portions connected thereto and movable therewith and an open top, said open top facing outwardly from the casing when in vertical position and serving to support wearing apparel suspended within the section when said section is in a closed position, said cover having side and end flanged portions which overlap the upper portion of the wardrobe section when the section and the cover are in closed position.

6. A trunk comprising a casing having an open top and a cover for said casing, and a wardrobe section hinged to one end or side of the casing and movable to a position within the casing and through the open top to a vertical position outside of the casing, said wardrobe section having an open top and being in the form of a tray when within the trunk, said open top facing outwardly from the casing, when the section is in a vertical position, and the bottom of the tray serving to support wearing apparel suspended within the section, when said section is in closed position, the hinged connection between the casing and wardrobe section being so constructed and positioned that when the wardrobe section is swung to a vertical position, said section will be in advance of the end or side of the trunk, to thereby adapt the trunk proper to be left beneath a berth and the wardrobe section to extend vertically outside and alongside of said berth.

In testimony that I claim the foregoing as my own, I have hereto affixed my signature in the presence of two witnesses.

GEORGE H. WHEARY.

Witnesses:

A. L. MORSELL,

MAX BLOCH.